United States Patent Office 3,523,892
Patented Aug. 11, 1970

3,523,892
METHOD OF FLOCCULATION WITH WATER-SOLUBLE CONDENSATION POLYMERS
Dallas L. Schiegg, Pittsburgh, Pa., assignor to Calgon Corporation, Pittsburgh, Pa.
No Drawing. Original application Dec. 20, 1965, Ser. No. 515,190, now Patent No. 3,391,090, dated July 2, 1968. Divided and this application Feb. 14, 1968, Ser. No. 705,307
Int. Cl. B01d *21/01*
U.S. Cl. 210—54             4 Claims

ABSTRACT OF THE DISCLOSURE

Suspended particulate matter is flocculated and removed from an aqueous medium by adding a condensation polymer of epihalohydrin and polyalkylene polyamine.

RELATED APPLICATION

This application is a division of my copending application Ser. No. 515,190, filed Dec. 20, 1965, now U.S. Pat. No. 3,391,090.

BACKGROUND OF THE INVENTION

This invention relates to water-soluble condensation polymers of polyalkylene polyamines and certain epoxyhalides, and to methods of flocculating suspended solids with said polymers in aqueous media.

The polyalkylene polyamines which I prefer to use in the condensation reaction with the epoxyhalides to make my final product may be referred to as "prepolymers." The prepolymers which I employ are made from smaller chain polyalkylene polyamines of the general formula $NH_2[(CH_2)_mNH]_nH$ where $n$ is about 4 to about 7 and $m$ is about 2 to about 4. These shorter chain polyalkylene polyamines need not be linear, but may be branched:

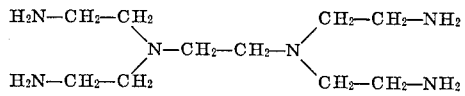

or cyclic whereby a piperazine ring is formed:

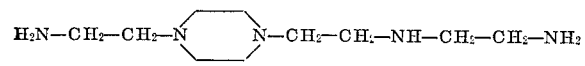

or both cyclic and branched:

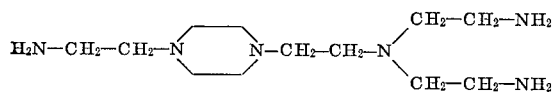

or mixtures of linear, branched, and cyclic. However, linear polyalkylene polyamines are preferred when the final product is to be used for flocculation purposes. I prefer tetraethylenepentamine, pentaethylenehexamine, hexaethyleneheptamine, and isomers thereof.

The first step in the preparation of the condensation polymers of this invention is to prepare a prepolymer of these polyalkylene polyamines by a condensation reaction with an alkyl dihalide of the general formula $X(CH_2)_pX$ where $p$ is 2, 3, or 4, preferably 2, and X is chlorine or bromine, preferably chlorine; ethylene dichloride is preferred. This invention contemplates only non-gem dihalides. Alpha-omega dihalides are preferred. Mixtures of different alkyl dihalides may be used. The prepolymer is prepared by heating a solution of polyalkylene polyamines and alkyl dihalide. Generally a base material, such as caustic soda, is also added to take up the hydrogen halide which is formed; caustic must be added very carefully or it will hydrolyze the alkyl dihalide, and a great deal of time is required for the addition, see Sintex Organico Industrial, S.A., Spanish Pat. 287,939. Also, the addition of caustic will cause NaCl to settle out which is difficult to separate from the highly viscous prepolymer by conventional processes such as centrifugation or filtration. The presence of sodium chloride crystals in the product renders difficult the maintenance of uniform solutions, and may cause clogging of equipment. I have found, however, that with the polyalkylene polyamines of this invention, it is not necessary to add a caustic substance. The reason for this is probably that the polyalkylene polyamines of this invention are of a higher molecular weight than are the polyalkylene polyamines usually employed by others. Because of this high molecular weight there are more amine groups available which, through protonation, will take up the hydrogen halide formed, thus obviating the necessity of adding caustic, and preventing the formation of NaCl crystals. See Jen and Moore U.S. Pat. 2,834,675, Kekish U.S. Pat. 3,174,928, and Chamot U.S. Pat. 3,184,294.

SUMMARY OF THE INVENTION

The novel condensation polymers of this invention are prepared by condensing the prepolymer prepared above with an $\alpha,\beta$-epoxyhalide compound of the general formula

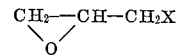

where X is chlorine or bromine. Other $\alpha,\beta$-epoxyhalides may be used; epichlorohydrin and epibromohydrin are preferred. The polymer produced by these methods will generally have a solution viscosity of about 500 to 5,000 cps. (Brookfield) at 50% concentration at 25° C.

This invention contemplates only water-soluble polymers. Thus, cross-linking must be kept at a minimum in order to prevent insolubility. This is accomplished by careful selection of quality of the reactants, the ratio of reactants, the method of polymerization, and other parameters already known to those skilled in the art.

This invention contemplates a polymer made from the reaction of about 50% to 80% short chain polyalkylene polyamine, about 10% to 30% alkyl dihalide, and about 10% to 20% $\alpha,\beta$-epoxyhalide. Preferably the polymer is made from the reaction of about 65% to 75% polyalkylene polyamine, about 12% to 17% alkyl dihalide, and about 10% to 20% $\alpha,\beta$-epoxyhalide.

The described polymers have been found effective as flocculants, as is shown in the discussion and data following Example III.

I have performed numerous experiments which demonstrate the production of many of the condensation polymers of this invention.

Example I

A 1-liter flask was fitted with a stirred, reflux condenser, thermometer, and an addition funnel, and 232 g. of "Amine E-100" was introduced. This is a product of Dow Chemical Company containing about 10% tetraethylenepentamine, about 40% pentaethylenehexamine, about 20% cyclized polyalkylene polyamines, and about 10% polyalkylene polyamines having chains greater than penetaethylene (mostly hexaethyleneheptamine and heptaethyleneoctamine).

250 g. of water was added and the solution heated to reflux. To the solution was added, at a suitable rate, 60 g., 0.6 mole, of ethylene dichloride. The addition rate of the EDC was carefully controlled so that a minimum of unreacted EDC excess was maintained. On completion of EDC addition the reaction mixture was held at 100°–110° for one hour. The reaction product at this point was a "prepolymer" as above described.

The "prepolymer" formed as above was heated to 80°

C. and the dropwise addition of 37 g., 0.4 mole, of epichlorohydrin (ECH) was begun. The temperature was allower to rise no higher than 90° during the addition. On completion of the addition the reaction mixture was held at 100° for 30 minutes. The resulting polymer was a 57.5% active solution with a viscosity of 2,000 cps.

If unreacted EDC accumulated in the reaction vessel during preparation of the prepolymer, it refluxes thus lowering the reaction temperature below the optimum value. Also, there is a chance of dehydrochlorinating the excess EDC to form volatile vinyl chloride, which would be lost. If addition is properly controlled, the heat source can be removed from the flask when EDC addition is started. The heat of reaction is sufficient to maintain reflux. In later states of the reaction, heat from an external source is again necessary.

Example II

In this preparation, the same procedure was followed as in Example I except that pentaethylenehexamine was used instead of "Amine E-100." The product was a highly viscous solution found to be useful in flocculating suspended matter.

Example III

In this preparation, the following ingredients were used: 34.7 parts by weight "Amine E-100," 37.7 parts by weight water, 7.4 parts ethylene dichloride, 7.9 parts epichlorohydrin, and an additional 12.3 parts water.

The initial water was added during the heating of the "Amine E-100." When refluxing began (about 212° F.), the ethylene dichloride was added gradually and the temperature was held at refluxing for one hour. The epichlorohydrin was then gradually pumped into the reactor over a period of about 45 minutes. The temperature was held at 212° F. for an additional two hours, and then the mixture was diluted to a 50% solution. It had a viscosity of 1950 cps. (Brookfield) after dilution.

As demands on water resources are ever increasing, it becomes even more important to render raw water satisfactory for human use and industrial processes. Often it is necessary to remove industrial wastes from water before it is returned to lakes and streams.

Frequently the most objectional contaminants in raw water and in water used in processes consists of suspended colloidal solids or organic color bodies.

Suspended solids can be removed by treatment with various inorganic electrolytes such as aluminum sulfate or ferric chloride; however, certain disadvantages are inherent in the use of these materials. Frequently it is necessary to adjust the pH of the water to make subsequent aluminum sulfate or ferric chloride treatment feasible. Lime is frequently employed for this purpose. Water treated in this fashion often has high concentration of residual metal such as aluminum, iron or calcium. These metals are usually undesirable contaminants.

Inorganic electrolytes are only effective in rather high concentrations in the range of 25 p.p.m. to 100 p.p.m. To employ these materials in such concentrations, it is necessary to transport and store large quantities of dry chemicals. The materials are somewhat corrosive and care must be employed in the design and use of equipment to handle the chemicals. Their caustic nature also poses a threat to personnel employed in the use of the materials.

After suspended solids have been removed from water by conventional treatment with inorganic polyelectrolytes, color bodies are frequently present in the water. These color bodies are, generally speaking, organic materials, the products of decomposition of vegetable matter In addition to their objectionable color, they often impart undesirable odor and taste to water.

Other frequent contaminants are anionic species such as dyes or detergents. These materials are usually not removable by simple inorganic electrolyte treatment of water.

Organic polyelectrolytes are generally more useful in removing suspended solids from water. Since colloidal particles are usually negatively charged, they can most readily be removed by treatment with cationic materials. Thus, cationic polyelectrolytes are the most useful of the organic polyelectrolytes.

A possible mechanism for the removal of these particles by cationic organic polyelectrolytes is described as follows.

The net negative charge of the suspended particles with respect to its environment (this charge is known as zeta potential) is neutralized by the strongly positive charge of the cationic organic polyelectrolyte. The particles are then absorbed on the cationic organic polyelectrolyte. Since the effect of electrostatic repulsion has been removed, these suspended particles can now coagulate to form larger masses which settle more rapidly. Such neutralization of zeta potential and absorption also occurs with inorganic electrolytes but with organic cationic polyelectrolytes, absorption can take place over a larger surface and in effect many of the suspended particles are absorbed on one molecule of the cationic organic polyelectrolyte. Since absorption of the particles occurs on a large surface of the polymer, the coagulated particles settle out more readily than in the case of inorganic electrolytes.

In addition to affording more effective coagulation the cationic organic polyelectrolytes of this invention are effective in concentrations of less than 5 p.p.m.—often in concentration of about 1 p.p.pm. or lower. Thus, it is not necessary to transport or store excessively large quantities of these materials as in the case of inorganic electrolytes. The polyelectrolytes of this invention are not particularly corrosive and little danger is involved to personnel in handling these materials.

Cationic polyelectrolytes are useful in removing color bodies and anionic contaminants from water. The mechanism involved in this case probably includes formation of insoluble salts of the anionic contaminant and the cationic electrolyte. Removal of these materials is often facilitated by adding a finely divided insoluble nucleating agent such as clay.

My condensation polymers can be used in combination with conventional inorganic coagulants such as alum, ferric chloride, lime, and so forth.

Example IV

My condensation polymers have been compared in performance to inorganic coagulants. The results are shown in the following table:

| | Floc characteristic | | | |
| --- | --- | --- | --- | --- |
| | Speed of forming, minutes | Size | Settling rate | Supernatant clarity | pH |
| 2 p.p.m. my polymer made by the process of Example I | 1 | 9− | 6+ | 6 | 5.5 |
| 30 p.p.m. soda ash and 50 p.p.m. alum | 1 | 15+ | 19+ | 7− | 5.7 |
| 25 p.p.m. lime and 50 p.p.m. ferric chloride | 1 | 15+ | 17 | 7− | 5.5 |

The figures in the columns headed "Size," "Settling Rate," and "Supernatant Clarity" are from an arbitrary scale in which 6 is the best and 24 is least desirable. The numbers assigned are based on visual observations. The water used in this example contained 100 p.p.m. montmorillonite clay suspension.

Example V

In a tin plating mill it was necessary to remove suspended solids from river water prior to demineralization of the water which is then used in plating baths.

Over a period of four months, the following dosages of chemicals were used to effect clarification in slag-blanket clarifier:

| | P.p.m. |
|---|---|
| Bentonitic clay | 19.5 |
| NaOH | 2.0 |
| A condensation polymer prepared in the manner of Example I | 1.75 |

The bentonitic clay was used as a nucleating agent. The NaOH was employed to keep the iron concentration low to prevent fouling of the ion exchange resins.

During the four-month period, 446 million gallons of water were treated by this method. Turbidity of the treated water was consistently less than 4 p.p.m. Turbidity of untreated water ran from 10 to 30 p.p.m. The operators found the floc bed was easy to control and no adverse effects were noted due to changes in solids concentration in the river water.

Thus, it may be seen that this invention relates to water-soluble condensation polymers of polyalkylene polyamines, alkyl dihalides, and $\alpha,\beta$-epoxyhalides, and to flocculation and removal of solids from water therewith.

I do not intend to be limited to any compounds, prepolymers, polymers, methods, or examples disclosed herein for illustrative purposes. My invention may be otherwise practiced and embodied within the scope of the following claims.

I claim:

1. Method of flocculating suspended particulate matter from an aqueous medium comprising adding to said aqueous medium a polymer made by reacting (a) about 50% to 80% polyalkylene polyamine of the general formula $NH_2[(CH_2)_mNH]_nH$, (b) about 10% to 30% non-gem alkyl dihalide of the general formula

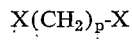

and then reacting the reaction product thereof with (c) about 10% to 20% $\alpha,\beta$-epoxyhalide of the general formula

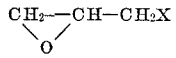

when $m$ is an integer from 2 to 4, $n$ is an integer of at least 4, $p$ is an integer from 2 to 4, and X is selected from the group consisting of chlorine and bromine, in an amount effective to cause flocculation.

2. Method of claim 1 in which (a) is present in an amount of about 65% to 75%, and (b) is present in an amount of about 12% to 17%.

3. Method of claim 1 in which (a) has the formula $NH_2(CH_2CH_2NH)_nH$, (b) has the formula $XCH_2CH_2X$, and $n$ is an integer from 4 to 7.

4. Method of claim 1 in which (a) is selected from the group consisting of tetraethylenepentamine, pentaethylenehexamine, hexaethyleneheptamine, and isomers thereof, and (b) is ethylene dichloride.

References Cited

UNITED STATES PATENTS 3,210,308  10/1965  Garms et al. _____ 210—54 X

FOREIGN PATENTS 826,770  1/1960  Great Britain.

MICHAEL E. ROGERS, Primary Examiner